United States Patent Office 3,828,066
Patented Aug. 6, 1974

3,828,066
DIGLYCIDYLIMIDAZOLIDONES
Daniel Porret, Binningen, Switzerland, assignor to Ciba-Geigy Corporation, Ardsley, N.Y.
No Drawing. Filed Dec. 29, 1972, Ser. No. 319,961
Claims priority, application Switzerland, Jan. 5, 1972, 108/72
Int. Cl. C07d 49/30, 49/34
U.S. Cl. 260—309.6          2 Claims

ABSTRACT OF THE DISCLOSURE

Diglycidylhexahydrobenzimidazolone and diglycidyltetrahydrobenzimidazolone. These compounds can be used by curing with amines or anhydrides, to manufacture casting resins, electrical resins, sintering powders and compression moulding compositions.

---

The subject of the invention are new diglycidylimidazolidones, namely optionally alkyl-substituted diglycidylhexahydrobenzimidazolidone and diglycidyltetrahydrobenzimidazolidone (=diglycidyltetrahydrobenz - 2[3H]-imidazolone), which can be used, by curing with amines or anhydrides, to manufacture casting resins, electrical resins, sintering powders, compression moulding compositions, B-stages and the like.

Diglycidylimidazolidones based on ethyleneurea or propyleneurea are already known from Swiss Patent Specification 471,149.

Further, diglycidylbenzimidazolone has been described in Russian Patent Specification 271,005. There, attention is also drawn to the exceptional compressive strength of the cured resins.

The diglycidylhexahydrobenzimidazolidones according to the invention, of the formula

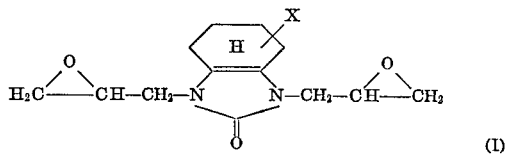

and diglycidyltetrahydrobenzimidazolidones according to the invention, of the formula

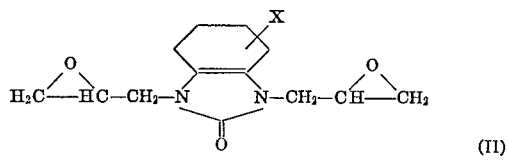

wherein X denotes hydrogen or an alkyl group with 1 to 4 carbon atoms, especially the methyl or ethyl group, can be manufactured easily and in good purity and lead to cured products which are more stable to water than the known product.

The diglycidyl-ethers of the formula (I) and (II) can be manufactured from the corresponding hexahydrobenzimidazolidones and tetrahydrobenzimidazolidones which possess, on the nitrogen atoms, groups which can be converted into epoxy groups, such as, in particular, a hydroxyhalogenopropyl group, for example the hydroxychloroethyl or hydroxybromoethyl group. The hydroxyl group can be in the 2- or 3-position and the halogen can be in the 3- or 2-position. The reaction is carried out in the customary manner, above all in the presence of agents which split off hydrogen halide, such as strong alkalis, for example anhydrous sodium hydroxide or aqueous sodium hydroxide solution. However, other strongly alkaline reagents, such as potassium hydroxide, barium hydroxide, calcium hydroxide, sodium carbonate or potassium carbonate can also be used for the purpose.

A further radical which can be converted into the 1,2-epoxyethyl radical is, for example, the prop-2-enyl group which can be converted into the 2,3-epoxypropyl group in a known manner, such as, above all, by reaction with hydrogen peroxide and a nitrile or with per-acids, for example peracetic acid, perbenzoic acid or monoperphthalic acid. The starting products can be obtained, for example, by reaction of 1 mol of hexahydrobenzimidazoles or tetrahydrobenzimidazoles with 2 mols of an epihalogenohydrin, above all epichlorohydrin, in the presence of a catalyst, such as, in particular, a tertiary amine, a quaternary ammonium base or a quaternary ammonium salt. Suitable catalysts for the addition of epichlorohydrin are above all tertiary amines, such as triethylamine, tri - n - propylamine, benzyldimethylamine, N,N' - dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium achloride, benzyltrimethylammonium acetate and methyltriethylammonium chloride; hydrazines with a tertiary nitrogen atom, such as 1,1 - dimethylhydrazine, which can also be employed in the quaternised form; alkali halides, such as lithium chloride, potassium chloride or sodium chloride, bromide or fluoride; further, ion exchange resins with tertiary or quaternary amino groups and also ion exchangers with acid amide groups. It is also possible to work without a catalyst.

The addition of the epihalogenohydrin to the hexahydrobenzimidazolidone or tetrahydrobenzimidazolidone can be carried out with or without solvent, with an excess of epichlorohydrin, at temperatures of up to 140° C., under the action of one of the catalysts mentioned, over the course of 30 to 360 minutes. The subsequent dehydrohalogenation can be carried out at 40 to 70° C. with solid or liquid alkalis and optionally whilst azeotropically distilling off the water formed. The alkali halide is separated off in a known manner. The resulting diglycidyl derivatives are isolated by distilling off the excess epihalogenohydrin and, if appropriate, the solvent. They are as a rule obtained as viscous, colourless to light brown liquids in yields of up to 100%. Tetrahydrobenzimidazolidone is easily obtainable by reaction of o-chlorocyclohexanone with urea. Catalytic hydrogenation of tetrahydrobenzimidazolidone with hydrogen yields hexahydrobenzimidazolidone (trans-form).

The diglycidyl compounds according to the invention of the formulae (I) and (II) react with the customary curing agents for epoxide compounds. They can therefore be crosslinked or cured by addition of such curing agents, analogously to other polyfunctional epoxide compounds. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N - dimethylpropylenediamine-1,3, N,N-diethylpropylenediamine - 1,3, 2,2 - bis-(4'-aminocyclohexyl)propane, 3,5,5 - trimethyl - 3 - (aminomethyl)cyclohexylamine ("isophoronediamine"), Mannich bases, such as 2,4,6 - tris - (dimethylaminomethyl)-phenol; m-phenylenediamine, p-phenylenediamine, bis - (4 - aminophenyl)-methane, bis-(4-aminophenyl)-sulphone and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethane-polyglycidyl-ethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylene tetramine, and dimerised or trimerised unsaturated fatty acids, such as dimerised linseed oil fatty acid (Versamid); polymeric polysulphides (Thiokol); dicyandiamide, aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; aceto-acetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4 - methylhexahydrophthalic anhydride, 3,6 - endomethylene - $\Delta^4$ - tetrahydrophthalic anhydride, 4 - methyl-3,6-endomethylene-$\Delta^4$ - tetrahydrophthalic anhydride (=methylnadic anhydride), 3,4,5,6,7,7 - hexachloro - 3,6 - endomethylene-$\Delta^4$-tetrahydrophthalic anhydride, succinic anhydride, adipic anhydride, trimethyladipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction, and in particular when using polyamides, dicyandiamide, polymeric polysulphides or polycarboxylic acid anhydrides as curing agents; such accelerators are, for example, tertiary amines, their salts or quaternary ammonium compounds, for example 2,4,6-tris-(dimethylaminomethyl)phenol, benzyldimethylamine, 2 - ethyl-4-methyl-imidazole and triamylammonium phenolate; or alkali metal alcoholates, such as, for example, sodium hexanetriolate.

A further subject of the invention are curable mixtures which contain a diglycidyl compound according to the invention, of the formula (I) or (II), optionally together with other polyepoxide compounds, and also curing agents for epoxy resins, such as polyamines or polycarboxylic acid anhydrides.

The diglycidyl compounds according to the invention or their mixtures with other polyepoxide compounds and/or curing agents can be mixed, before curing, with customary modifiers, such as extenders, fillers and reinforcing agents, pigments, dyestuffs, plasticisers, flow control agents, agents for conferring thixotropy, flameproofing substances and mould release agents.

As extenders, reinforcing agents, fillers and pigments which can be introduced into the curable mixtures according to the invention there may, for example, be mentioned: coal tar, bitumen, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel (Aerosil), lithopone, baryte, titanium dioxide, carbon black, graphite, iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone alcohol, ethylene glycol monomethylether, monoethyl ether and monobutyl ether.

Particularly for use in the lacquer field, the new diglycidyl compounds can furthermore be partially or completely esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixture can serve, in the unfilled or filled state, optionally in the form of a solutions or emulsions, as laminating resins, paints, lacquers, dipping resins, impregnating resins, casting resins, compression moulding compositions, sintering powders, spreading and surface-filling compositions, floor covering compositions, potting and insulating compositions for the electrical industry, and adhesives, and for the manufacture of such products.

Cured mouldings of this resin display good heat stability, good electrical properties and outstanding stability to water, coupled with good mechanical properties.

MANUFACTURING EXAMPLES

Example 1

56 g. of hexahydrobenzimidazolidone (0.4 mol) together with 740 g. of epichlorohydrin (8.0 mols) and 0.5 g. of tetramethylammonium chloride are stirred for 110 minutes at 115–118° C. Hereupon, a clear dark solution results. An azeotropic circulatory distillation is established by application of vacuum (60–90 mm. Hg) at an external temperature of 140–148° C. in such a way that at a temperature of the reaction mixture of 59–61° C. a vigorous distillation takes place. 70.4 g. of 50% strength aqueous sodium hydroxide solution are then added dropwise over the course of 5 hours whilst stirring vigorously; at the same time the water present in the reaction mixture is continuously removed azeotropically, and separated off.

Thereafter, distillation is carried out for a further 60 minutes under the conditions indicated in order to remove the last remnants of water from the batch. The batch is then cooled to about 35° C. The sodium chloride produced in the reaction is removed by filtration; the residue is washed with a little epichlorohydrin and the combined epichlorohydrin solutions are extracted by shaking with 400 ml. of water, to remove salt and remnants of alkali. The organic phase is concentrated at 60° C. under a water pump vacuum and is then dried to constant weight at 100° C./0.2 mm. Hg 89 g. (88.2% of theory) of a liquid, light brown resin with 6.73 epoxide equivalents/kg. (84.8% of theory), essentially corresponding to the following structure

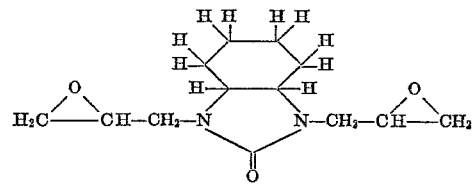

are obtained.

Example 2

Analogously to Example 1, 420.5 g. of tetrahydrobenzimidazolidone (3.0 mols) are treated with 2.5 g. of tetramethylammonium chloride in 4,700 ml. of epichlorohydrin (60.0 mols). The dehydrohalogenation is again carried out according to Example 1, with 528 g. of 50% strength aqueous sodium hydroxide solution (6.6 mols). The working up and isolation of the product is carried out in the usual manner. 747 g. (99.5% of theory) of a clear, light brown, viscous liquid containing 0.65% of total chlorine and having an epoxide content of 7.50 equivalents/kg. (93.6% of theory) are obtained.

The product can be purified as follows:

It is first subjected to a high vacuum distillation; this yields a product with 7.90 epoxide equivalents per kilogram which boils at 160–162° C./0.08 mm. Hg and slowly crystallises at room temperature. This substance is recrystallised in the ratio of 1:4 from a mixture of acetone/ether (1:5). Colourless crystals are obtained, which melt at 88–91° C. and have an epoxide content of 7.98 epoxide equivalents/kg. (99.9% of theory).

The microanalysis gives the following values: Calculated (percent): C, 62.38; H, 7.25; N, 11.10. Found (percent): C, 62.48; H, 7.28; N, 11.26.

Accordingly, the new diglycidyl compound corresponds to the following structure:

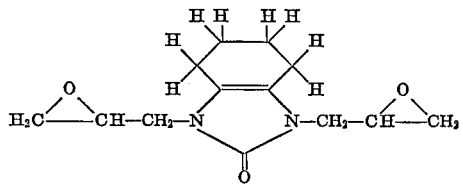

Example 3

Analogously to Example 1, 6.9 g. of 5-methyl-tetrahydrobenzimidazolidone (0.0453 mol) are reacted with 0.3 g. of tetramethylammonium chloride in 125.6 g. of epichlorohydrin (1.358 mols) at 115–118° C. The dehydrohalogenation is also carried out according to Example 1 with 7.98 g. of 50% strength aqueous sodium hydroxide solution (0.0996 mol). After the customary working up of the product, 11.9 g. (100% of theory) of a viscous, light brown resin with 6.93 epoxide equivalents/kg. (91.7% of theory), essentially corresponding to the following structure:

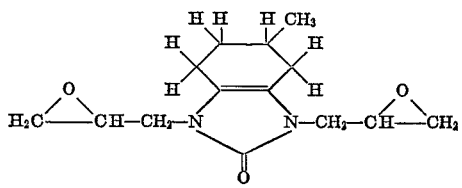

are obtained.

USE EXAMPLES

Example I 100 g. of the crude epoxide resin obtained according to Example 2, containing 7.50 epoxide equivalents/kg., are mixed with 106 g. of hexahydrophthalic anhydride at 80° C. to give a homogeneous melt and the mixture is deaerated and poured into an aluminium casting mould prewarmed to 80° C. Curing takes place in 5 hours at 80° C.+2 hours at 120° C.+20 hours at 150° C. Clear, transparent mouldings having the following excellent mechanical properties are obtained:

Flexural strength (VSM) _____kp./m.²__ 14–18.5
Deflection (VSM) _____mm__ 4.5–7.3
Impact strength (VSM) _____ cm.·kp./cm.²__ 16–20
Heat distortion point according to Martens
 (DIN) _____° C__ 154
Water absorption (1 hour at 100° C.) _percent__ 0.58

Example II 100 parts by weight of the epoxide resin manufactured according to Example 2 are mixed with 37 parts by weight of methylenebisaniline and cured for 2 hours at 80° C. and 8 hours at 140° C., as indicated in Example I. The mouldings show the following properties:

Impact strength (VSM) _____cm.·kp/cm.²__ 17.6
Flexural strength (VSM) _____kp./mm.²__ 20.2
Deflection (VSM) _____mm__ 7.7
Heat distortion point according to Martens
 (DIN) _____° C___ 148
Water absorption:
 4 days at room temperature _____percent__ 0.73
 1 hour in boiling water _____do____ 0.70
Tensile shear strength on Anticorodal B _kg./mm.²__ 0.9

Example III 100 parts by weight of the epoxide resin manufactured according to Example 2 are cured with 44 parts by weight of 4,4'-diamino-3,3'-(dimethyldicyclohexyl)-methane for 24 hours at 40° C. and 6 hours at 100° C. The mouldings obtained as in Example I show the following properties:

Impact strength (VSM) _____cm.·kp./cm.²__ 12.6
Flexural strength (VSM) _____kp./mm.²__ 14.3
Deflection (VSM) _____mm__ 4.6
Heat distortion point according to Martens
 (DIN) _____° C__ 119
Water absorption (1 hour in boiling water)
  percent__ 0.77
Tensile shear strength on Anticorodal B _kg./mm.²__ 0.6

What is claimed is:
1. A diglycidyl compound of Formula (I) or (II)

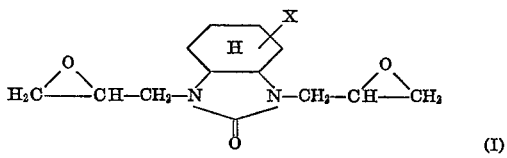

(I)

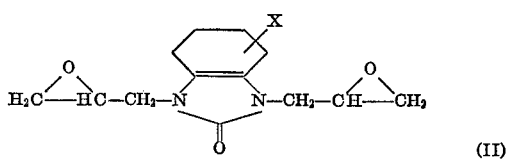

(II)

in which X denotes hydrogen or alkyl of 1 to 4 carbon atoms.

2. A diglycidyl compound according to claim 1, whereing X in formula (I) or (II) denotes methyl or ethyl.

References Cited

UNITED STATES PATENTS 3,429,833  2/1969  Porret _____ 260—309.7

FOREIGN PATENTS 1,932,306  3/1970  Germany _____ 260—309.7

NATALIE TROUSOF, Primary Examiner

U.S. Cl. X.R.

260—2 EC, 2 EA, 2 EP, 18 EP, 30.4 EP, 30.6 R, 31.8 E, 37 EP, 78.4 EP, 309.7, 824 EP, 830 R, 830 TW, 830 S, 831, 834, 835, 836